(12) United States Patent
Bialas et al.

(10) Patent No.: US 9,599,216 B2
(45) Date of Patent: Mar. 21, 2017

(54) PUSH-BUTTON SHIFTER ASSEMBLY WITH BUTTON STATE DETERMINATION LOGIC

(71) Applicant: GM GLOBAL TECHNOLOGY OPERATIONS LLC, Detroit, MI (US)

(72) Inventors: Daniel A. Bialas, Ann Arbor, MI (US); Orson S. Wang, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 345 days.

(21) Appl. No.: 14/264,111

(22) Filed: Apr. 29, 2014

(65) Prior Publication Data

US 2015/0308566 A1    Oct. 29, 2015

(51) Int. Cl.
| | |
|---|---|
| *F16H 59/12* | (2006.01) |
| *F16H 61/02* | (2006.01) |
| *H01H 13/14* | (2006.01) |
| *F16H 61/12* | (2010.01) |

(52) U.S. Cl.
CPC ......... *F16H 61/0213* (2013.01); *F16H 59/12* (2013.01); *H01H 13/14* (2013.01); *F16H 2061/122* (2013.01); *H01H 2203/038* (2013.01); *H01H 2231/026* (2013.01)

(58) Field of Classification Search
None
See application file for complete search history.

(56) References Cited

U.S. PATENT DOCUMENTS

| | | | | |
|---|---|---|---|---|
| 6,056,669 A | * | 5/2000 | Marshall | ................. F16H 59/12 |
| | | | | 340/456 |
| 8,138,906 B2 | * | 3/2012 | Wang | ...................... F16H 63/42 |
| | | | | 192/48.1 |
| 2012/0001747 A1 | * | 1/2012 | Klatt | .................... B60Q 3/004 |
| | | | | 340/456 |

* cited by examiner

*Primary Examiner* — Edwin A Young
(74) *Attorney, Agent, or Firm* — Quinn Law Group, PLLC

(57) ABSTRACT

A vehicle or other system includes an actuator assembly operable to achieve a selected operating state of the system in response to an electronic state selection signal, a push-button shifter assembly, and a controller. The shift assembly includes push-buttons, each including at least three redundant switches. A binary open/closed state of each switch defines the electronic state selection signal. The controller is in by-wire communication with the actuator and push-button shifter assemblies, and receives the electronic state selection signal. The controller determines a pressed, released, or unknown button state of each push-button by determining, in response to the electronic state selection signal, if all of the redundant switches have closed. If all of the redundant switches have not closed, the controller determines whether fewer than all of the switches have closed and opened within a calibrated time interval of each other.

17 Claims, 2 Drawing Sheets

PUSH-BUTTON SHIFTER ASSEMBLY WITH BUTTON STATE DETERMINATION LOGIC

TECHNICAL FIELD

The present disclosure relates to a push-button shifter assembly with button state determination logic.

BACKGROUND

In a conventional vehicle having an automatic transmission, a driver manually selects a desired transmission range using a multi-position Park, Reverse, Neutral, Drive, and Low (PRNDL) lever. For instance, the driver could move the PRNDL lever to a drive (D) position to thereby select a forward drive operating range. A typical PRNDL lever is mechanically coupled to a detent lever and a manual valve assembly, usually via a length of cable. Movement of the PRNDL lever rotates the detent lever, which in turn shifts the transmission to the selected operating range. Shift logic thereafter automatically controls the progression of gears occurring during any required gear shift within the selected operating range.

Alternative shift-by-wire transmission designs are characterized by an absence of a direct mechanical linkage between the PRNDL lever and the detent lever/manual valve assembly. Transmission operating range selection in a by-wire design instead occurs by way of electronic control signals transmitted to a drive motor or other downstream actuator. The drive motor is connected to the detent lever, and responds to the electronic control signals by rotating the detent lever to the selected operating range position.

SUMMARY

A system is disclosed herein that includes an actuator assembly, a push-button shifter assembly, and a controller. The actuator assembly achieves a selected operating state of the system in response to an electronic state selection signal, such as a shift of a transmission to a desired operating range when the system is an example automatic transmission. The push-button shifter assembly has multiple push-buttons, each of which includes at least three redundant switches. A binary state of each switch defines the electronic state selection signal. The controller is in by-wire communication with the actuator assembly and the push-button shifter assembly, i.e., no mechanical connection exists between the push-button shifter assembly and the actuator assembly.

The controller is programmed to determine a "pressed", "released", or "unknown" button state of each push-button. The controller does this by determining, in response to receiving the electronic state selection signal, whether fewer than all of the redundant switches have closed and then opened within a calibrated time interval of each other. For instance, when three redundant switches are used, a closed state of all three of the switches at any time may indicate a pressed push-button, while closure and opening of only two of the three push-buttons within a calibrated interval of each other indicates a pressed push-button. If all three prior-closed switches are not open at some later point in time, the button state is unknown.

The controller may be programmed to execute a control action with respect to the system based on the determined button state, such as shifting the transmission to the selected operating range in a transmission embodiment of the system.

In a possible embodiment, each push-button includes a cap covering the redundant switches, and the redundant switches are arranged in electrical parallel with each other. Separate analog-to-digital (A/D) converters are in communication with a corresponding one of the switches. For example, when three redundant switches are used, three A/D converters may be used, i.e., one A/D converter per switch. The A/D converters may also be a single A/D converter, which in turn may be integrated with the controller.

In the transmission embodiment noted above, the push-button shifter assembly has multiple push-buttons for selecting a desired operating range, with each push-button including three or more redundant switches. Depression of any one of the push-buttons should, under normal conditions, close all of the redundant switches, and thereby request a shift to a desired operating range associated with that particular push-button, e.g., park (P), reverse (R), neutral (N), drive (D), or low (L). However, it is recognized herein that fewer than all of the redundant switches may close in rare circumstances, or may close even when the push-button is not actually pressed. The present invention is intended to determine whether a given push-button is in fact pressed, or if the button state is unknown, and to enable suitable control actions in response to such a button state determination.

The controller described herein maybe embodied as one or more computer devices, microchips, or microprocessors programmed to determine a pressed/released button state of each of the push-buttons. To do this, the controller executes instructions to determine if all of the redundant switches have closed within a particular time interval of each other. In an example three-switch embodiment, if only two of the three redundant switches have closed, the controller evaluates whether the two switches have closed in a substantially simultaneous manner, which as used herein means closure within a small calibrated interval of time. For example, if a typical button press event is on the order of 100 ms, the small calibrated window may be 25 ms or less.

If either condition is true, the controller determines that the push-button has been pressed, i.e., that a driver has affirmatively requested a particular operating range by pressing on a corresponding push-button. The controller may thereafter execute a control action with respect to the transmission in response to this determination, for instance by commanding a shift of the transmission to the selected range.

The above features and advantages and other features and advantages of the present invention are readily apparent from the following detailed description of the best modes for carrying out the invention when taken in connection with the accompanying drawings.

DETAILED DESCRIPTION

Figure 1:
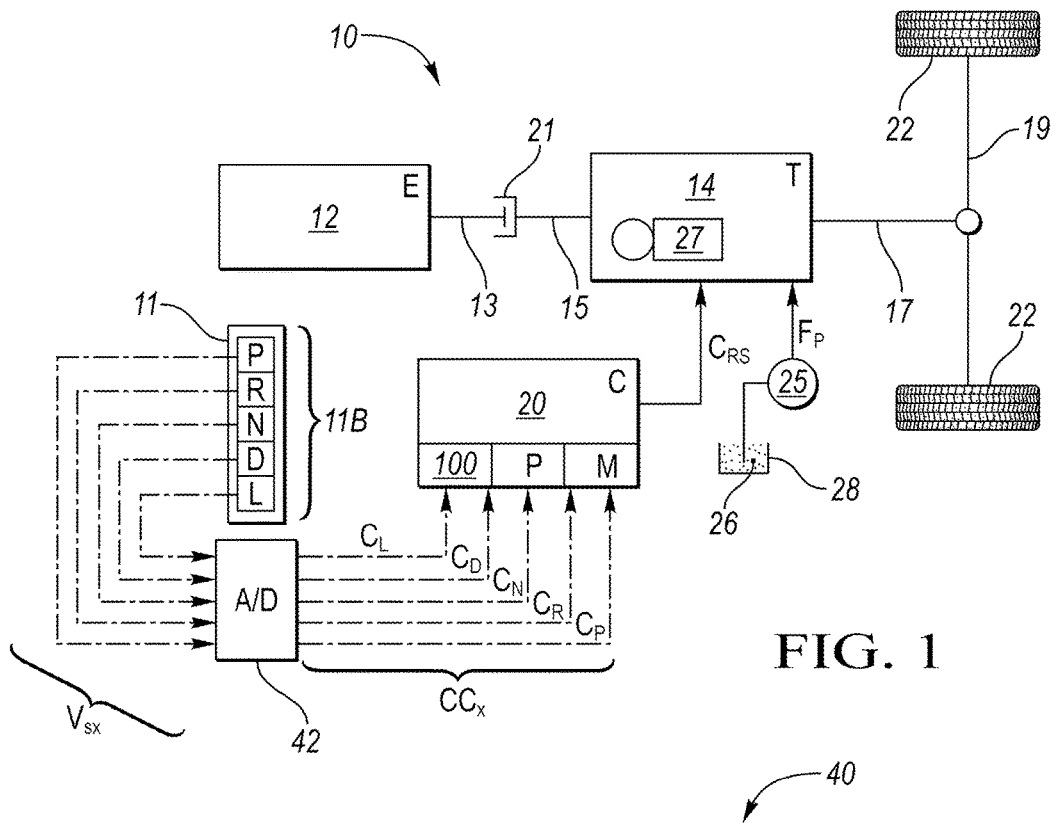
FIG. 1 is a schematic illustration of an example vehicle having a by-wire push-button shifter assembly and a controller programmed to determine when a given push-button of the range shifter assembly has been pressed or released.

Referring to the drawings wherein like reference numbers correspond to like or similar components throughout the several figures, a system in the form of an example vehicle 10 is shown schematically in FIG. 1. The vehicle 10 includes a push-button shifter assembly 11 as explained below, and may also include an internal combustion engine (E) 12 and a transmission 14 depending on the design. As shown, the transmission 14 includes an input member 15 and an output member 17. The output member 17 ultimately delivers output torque from the transmission 14 to a drive axle 19 to power a set of drive wheels 22. A torque input device 21 such as a friction clutch and damper assembly or a hydrodynamic torque converter may be disposed between an output shaft 13 of the engine 12 and the input member 15 so as to control engagement and damping of the engine 12 with the transmission 14. In some embodiments of the transmission 14, fluid pressure (arrow $F_P$) may be provided via a fluid pump 25 that draws fluid 26 from a sump 28. Dry transmissions may omit the fluid pump 25, fluid 26, and sump 28. Likewise, the vehicle 10 may be an electric vehicle, and thus the particular powertrain components of the vehicle 10 as shown in FIG. 1 are merely exemplary of one possible design.

The vehicle 10 also includes an electronically-controlled actuator assembly 27, such as a motor or linear actuator-driven detent lever and main valve assembly of the type known in the art, and a controller (C) 20. The controller 20 is programmed to determine a pressed, released, or unknown button state of each of a plurality of push-buttons 11B of the push-button shifter assembly 11 via a method 100 as explained below. The actuator assembly 27, which is in electrical communication with the push-button shifter assembly 11 via the controller 20, is operable to achieve a selected operating state of the vehicle 10 in response to an electronic state selection signal (arrows $CC_X$). In the example configuration described herein, the selected operating state is a desired operating range of the transmission 14, and the electronic state selection signals (arrows $CC_X$) are respective operating ranges of the transmission 14, e.g., park (P), reverse (R), neutral (N), drive (D), and low (L), although the method 100 is not limited to such a system.

The actuator assembly 27, which is shown schematically in FIG. 1 for illustrative simplicity, may include any number of motors and/or linear actuators, hydraulic servo valves, fluid conduit, detent levers, springs, and/or other linkages and/or fluid control components needed for shifting the transmission 14 into a desired operating range. Transmission operating ranges typically include the PRNDL ranges noted above, although some designs may provide for selection of multiple low gear ranges such as L1, L2, and L3.

The push-buttons 11B shown in the schematic example depiction of FIG. 1 include multiple individual push-buttons, labeled P, R, N, D, and L in FIG. 1 for a typical PRNDL design, with each push-button 11B corresponding to a respective one of the possible PRNDL operating ranges. For instance, depression of the push-button P requests a range shift of the transmission 14 to the drive (D) range, depression of the push-button R requests a range shift of the transmission 14 to the reverse (R) range, and so forth.

The connections between each of the push-buttons 11B and the actuator assembly 27 are characterized by an absence of mechanical couplings or linkages, such as the length of cable disposed between a PRNDL lever and a detent lever in a conventional PRNDL lever design of the type described above. Instead, all communication occurring between the push-button shifter assembly 11 and the actuator assembly 27 occurs electronically, i.e., by-wire. For example, low-voltage wires (not shown) or an auxiliary wiring harness may be routed from the push-button shifter assembly 11 to the controller 20, and a controller area network (CAN) bus (not shown) may connect the controller 20 to the actuator assembly 27.

Figure 2:
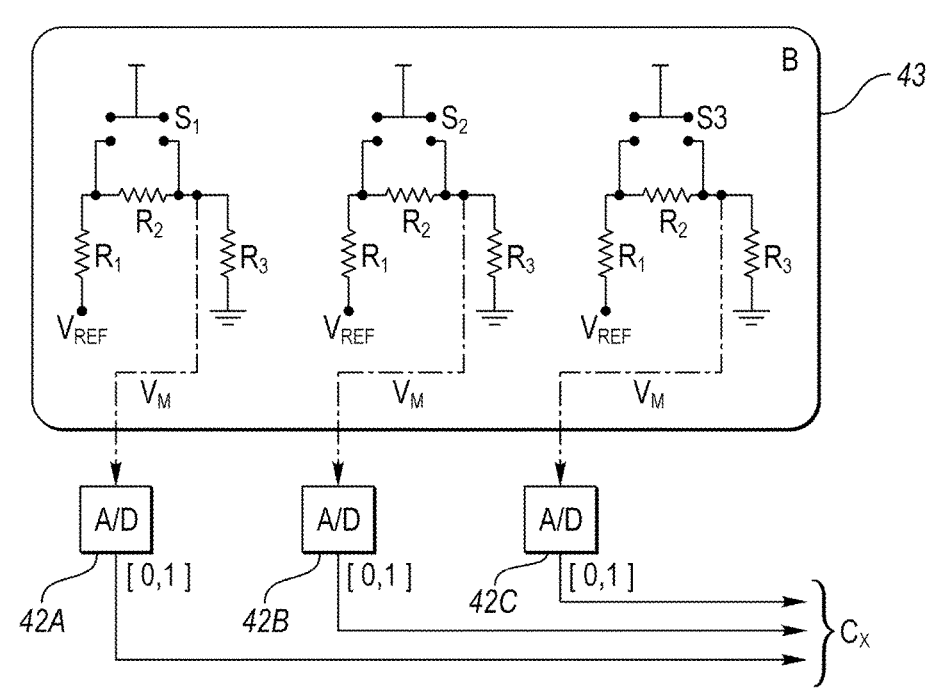
FIG. 2 is a schematic circuit diagram of an example push-button with three redundant switches for use in the vehicle shown in FIG. 1.

In the present invention, pressing a given one of the push-buttons 11B shown in FIG. 1 ultimately results in the generation of a range request signal (arrow $C_{RS}$) or other electronic state selection signal, which is then communicated to the actuator assembly 27 by the controller 20. In an example embodiment, pressing on a given one of the push-buttons 11B generates an analog switch voltage signal, with the analog switch voltage signals indicated collectively in FIG. 1 as arrows $V_{SX}$. The switch voltage signals $V_{SX}$ are processed by one or more analog-to-digital (A/D) converters 42, shown for simplicity as one unit in FIG. 1. The A/D converters may be alternatively embodied as multiple A/D converters 42A, 42B, and 42C as shown in FIG. 2, and/or may be integrated into the controller 20. Corresponding sets of binary (0 or 1) switch state signals for each push-button 11B, i.e., $C_P$, $C_R$, $C_N$, $C_D$, or $C_L$, collectively $CC_X$ in FIG. 1, are then transmitted to the controller 20, which in turn transmits the range request signal ($C_{RS}$) to the actuator assembly 27 to request a desired operating range.

The controller 20 of the present invention is depicted as a single device for illustrative clarity. When so configured, the controller 20 may be embodied as a transmission control module or any other suitable vehicle controller. However, the controller 20 may be decentralized into multiple control chips, microprocessors, or control modules to provide the functionality detailed below. Embodiments of the controller 20 may therefore include a processor P and sufficient amounts of memory M, at least some of which is tangible and non-transitory to include the instructions needed for implementing the method 100. For instance, the memory M may include sufficient read only memory (ROM), random access memory (RAM), electrically-programmable read-only memory (EPROM), flash memory, etc., and any required circuitry including but not limited to a high-speed clock (not shown), analog-to-digital (A/D) circuitry in addition to the A/D converter(s) 42, digital-to-analog (D/A) circuitry, a digital signal processor (DSP), and the necessary input/output (I/O) devices and other signal conditioning and/or buffer circuitry. Among other possible tasks, the controller 20 is specifically programmed to execute instructions embodying the method 100, as explained below with reference to FIGS. 2 and 3.

An example circuit implementation 40 includes a representative push-button B as shown in FIG. 2. The push-button B used in this illustrative example may be any one of the P, R, N, D, and L push-buttons shown in the example range shifter assembly 11 of FIG. 1. The push-button B includes a plurality of redundant switches. An example design uses exactly three redundant switches $S_1$, $S_2$, and $S_3$ connected in electrical parallel with respect to each other. More redundant switches may be used without departing from the intended inventive scope. However, as the three-switch example embodiment provides a good balance of performance, reliability, and minimal component count, the three-switch design of FIG. 2 will be used hereinafter for illustrative consistency.

In a three-switch system, closure of all three redundant switches $S_1$, $S_2$, and $S_3$ should indicate a "pressed" state of the push-button B with a high degree of confidence. That is, if all three redundant switches $S_1$, $S_2$, and $S_3$ are closed at any given point in time, this conventionally indicates that the push-button B has in fact been pressed. However, it is recognized herein that certain errant switch closure patterns may occur, whether due to an electrical fault, an uneven button pressing force, or a transient electrical error. That is, fewer than all of the redundant switches $S_1$, $S_2$, and $S_3$ may close when the push-button B is pressed, or some of the switches $S_1$, $S_2$, and/or $S_3$ may close at different points in time. An appropriate button state may be "unknown", as used herein, to cover situations where the various logic states of the redundant switches $S_1$, $S_2$, $S_3$ are inconclusive.

Conventional switch logic approaches that monitor solely for a closed state of all of redundant switches $S_1$, $S_2$, and $S_3$ at any point time may be less than optimal. Likewise, simple "majority voting" approaches that look for a majority of closed switches to be closed may fail to detect similar faults, or may treat a fault state as read by two of the redundant switches as being the true button state of that push-button B. The method 100 described below is intended to provide a more robust approach toward button state determination, or equally robust operation with fewer required redundant switches than are used in conventional "majority vote" strategies.

To accomplish the desired improved button state determination function, the controller 20 of FIG. 1 is programmed to closely monitor the closed/open binary states and temporal coincidence of any button state transitions for each the redundant switches $S_1$, $S_2$, and $S_3$. By executing the method 100, the controller 20 is able to determine that a given push-button B is pressed only when the binary states of the redundant switches $S_1$, $S_2$, and $S_3$ meet predetermined button state conditions as set forth below with reference to FIGS. 3 and 4.

The example switch configuration of FIG. 2 may be embodied as a silicon or other dome-type push-button design. A cap 43 may span the redundant switches $S_1$, $S_2$, and $S_3$. The shape, materials, and cosmetic finish of the cap 43 may vary with the intended design. For example, if a rigid version of the cap 43 is used, such as a molded hard plastic cap, the cap 43 may be spring-biased so that the cap 43 quickly returns to a released position after the push-button B is released. Alternatively, the cap 43 may be constructed of silicon, rubber, or other resilient material, such that the cap 43 itself is sufficiently resilient, i.e., able to return to its released position via its own resilience. In all designs, force acting on the cap 43 when the cap 43 is pressed is intended to close the redundant switches $S_1$, $S_2$, and $S_3$.

Beneath the cap 43, each redundant switch $S_1$, $S_2$, and $S_3$ may be electrically connected to a respective one of the analog-to-digital (A/D) converters 42A, 42B, and 42C noted above, and optionally to a set of resistors $R_1$, $R_2$, $R_3$. The A/D converters 42A, 42B, 42C may be part of the controller 20 of FIG. 1 or a separate device(s). The redundant switches $S_1$, $S_2$, and $S_3$ are also electrically connected to a reference voltage supply ($V_{REF}$), for instance a 5 VDC supply, which may be either a DC battery, DC lead of a printed circuit board assembly, or an auxiliary voltage output of a DC-DC converter (not shown). Depression of the cap 43 closes the redundant switches $S_1$, $S_2$, and/or $S_3$.

A closed switch will provide a DC voltage for that particular switch in the range of 1-4 VDC in a non-limiting example 5 VDC embodiment to one of the A/D converters 42A, 42B, and 42C. The particular voltage range in practice will depend on the resistance values selected for resistors $R_1$, $R_2$, $R_3$ for each redundant switch $S_1$, $S_2$, and $S_3$. That is, the resistors $R_1$, $R_2$, $R_3$ are selected in the design phase to regulate the reference voltage supply ($V_{REF}$) to a lower voltage range, and provide a positive voltage such as 1 VDC when the switch is open. Absent the resistors $R_1$, $R_2$, $R_3$, one would not be able to readily discern the difference between an open switch and an open circuit, e.g., a broken conductor.

The A/D converters 42A, 42B, and 42C, as is well known in the art, are operable to convert an analog measured voltage ($V_M$) to a corresponding digital output, which in this instance is a binary state of 0 or 1. For example, a VDC input of 1 VDC may correspond to an open switch $S_1$, $S_2$, or $S_3$, and thus correspond to a binary value of 0, while a closed switch should provide 4 VDC to the respective A/D converter 42A, 42B, or 42C, which in turn corresponds to a binary value of 1. Voltage values falling anywhere between the predefined/calibrated voltage range of 1-4 VDC may be treated as faults by the controller 20.

The A/D converters 42A, 42B, and 42C may be optionally configured to treat a small range of DC voltages as corresponding to one of the two binary values, e.g., an analog measured voltage ($V_M$) in the range of 0.95-1.05 VDC as corresponding to a binary value of 0 and an analog range of 3.95-4.05 VDC as corresponding to a binary value of 1. As the redundant switches $S_1$, $S_2$, and $S_3$ are expected to be either open or closed, any voltage values falling in between the limits of the defined range, nominally [1, 4] VDC in the simplified example of FIG. 2, should be rare or non-existent.

The A/D converters 42A, 42B, and 42C of FIG. 2 each output a binary value 0 or 1 as a button state for a respective one of the redundant switches $S_1$, $S_2$, and $S_3$. The binary values are transmitted to the controller 20, with the binary values forming the switch state signals $SS_1$, $SS_2$, and $SS_3$ shown in FIG. 3 and discussed below. In other words, for a three-switch design, the state of the push-button is determined by the switch state signals $SS_1$, $SS_2$, and $SS_3$ for the push-button, with the switch state signals for a single push-button B shown in FIG. 2 as a single button state signal $C_X$. The button state signals for all of the push-buttons 11B of the push-button shifter assembly 11 in FIG. 1 as button state signals $CC_X$.

Other switch designs may be envisioned within the scope of the present invention, and therefore the dome-type embodiment of FIG. 2 is intended to be non-limiting. For example, pressing on the push-button B may move three magnetic plungers toward three Hall-effect sensors (not shown), with the switching voltage in this instance being proportional to the proximity of the magnetic plungers to the Hall-effect sensors. The A/D converters 42A, 42B, and 42C could function identically in such an alternative design, with the voltage output of the Hall-effect sensors being converted to a binary switch state signal. Thus, other switch designs can be used without departing from the intended inventive scope.

Figure 4:
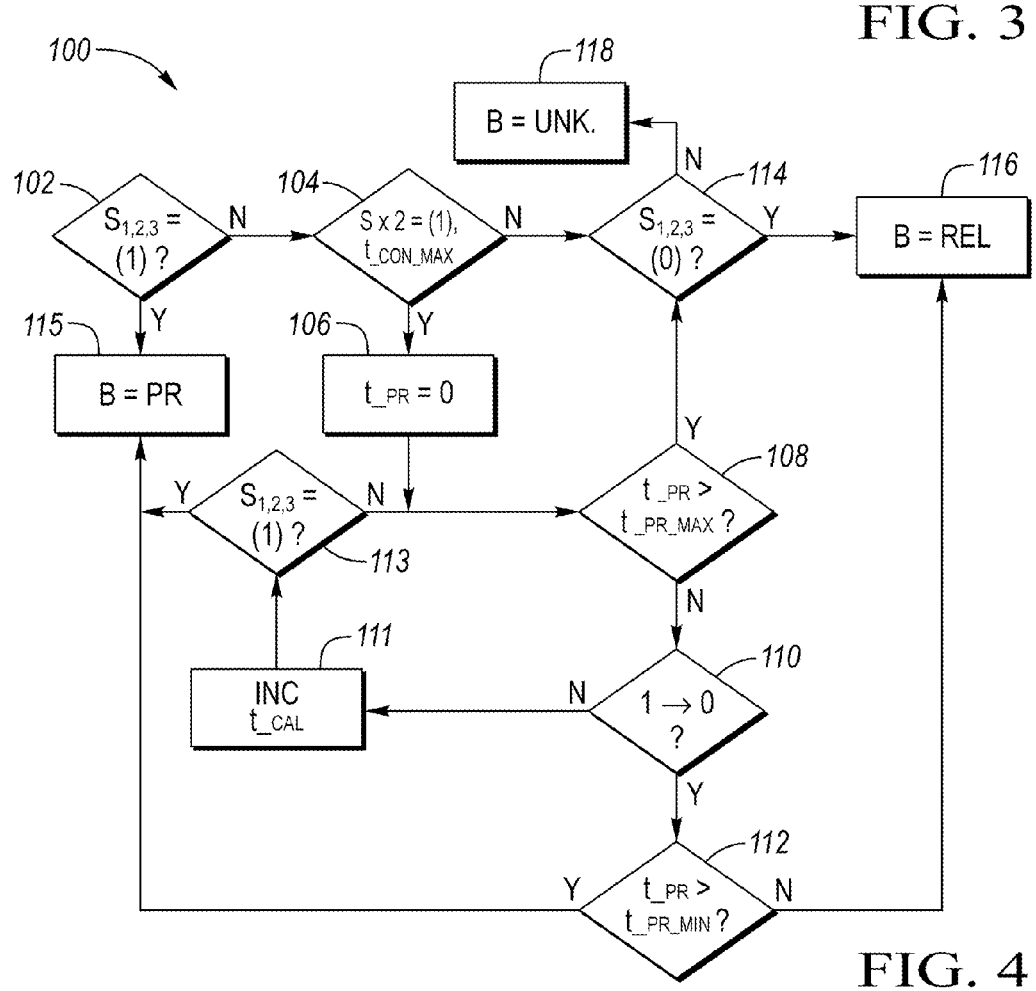
FIG. 4 is a flow chart describing an example method for determining whether a given push-button has been pressed or released.

Referring to FIG. 4, the method 100 may be encoded as computer-readable instructions residing in memory M of the controller 20 shown in FIG. 1. An example embodiment of the method 100 begins with step 102, wherein the controller 20 determines if all three redundant switches $S_1$, $S_2$, and $S_3$ have closed, with the closed state indicated in FIG. 2 as a binary value of 1. Various approaches may be taken to achieve the desired ends of step 102, including determining if at any point in time the three redundant switches $S_1$, $S_2$, and $S_3$ all have a binary switch state of 1, or if each redundant switch $S_1$, $S_2$, and $S_3$ transitions to a binary state of 1 within a calibrated duration of the immediately-preceding switch to make such a transition. The method 100 proceeds to step 104 if all three redundant switches $S_1$, $S_2$, and $S_3$ are not closed, i.e., if at least one of the redundant switches $S_1$, $S_2$, and $S_3$ has a binary state of 0, and to step 115 if all three redundant switches $S_1$, $S_2$, and $S_3$ are in a closed state/binary state of 1.

Step 104 entails determining whether any two of the redundant switches $S_1$, $S_2$, and $S_3$ for one of the push-buttons 11B of FIG. 1 have transitioned from an open (0) state to a closed (1) state within a calibrated duration, which is abbreviated in FIG. 4 as $t\_{con\_max}$. The calibrated duration $t\_{con\_max}$ for step 104 is a calibrated maximum amount of time within which the two redundant switches can transition to a closed (1) state and still have the transition be considered "concurrent" or "simultaneous" for the purposes of the method 100. In an example embodiment, the calibrated duration $t\_{con\_max}$ may be between 20-30 ms, which is appropriate where a typical button-pressing event takes about 100 ms to complete. Therefore, the actual point in time in which switch $S_1$ transitions to a closed (1) state may differ slightly from the actual point in time that the switch $S_2$ makes the same transition, with the time difference being considered by the controller 20 to occur simultaneously if the transition occurs within the calibrated duration $t\_{con\_max}$.

Figure 3:
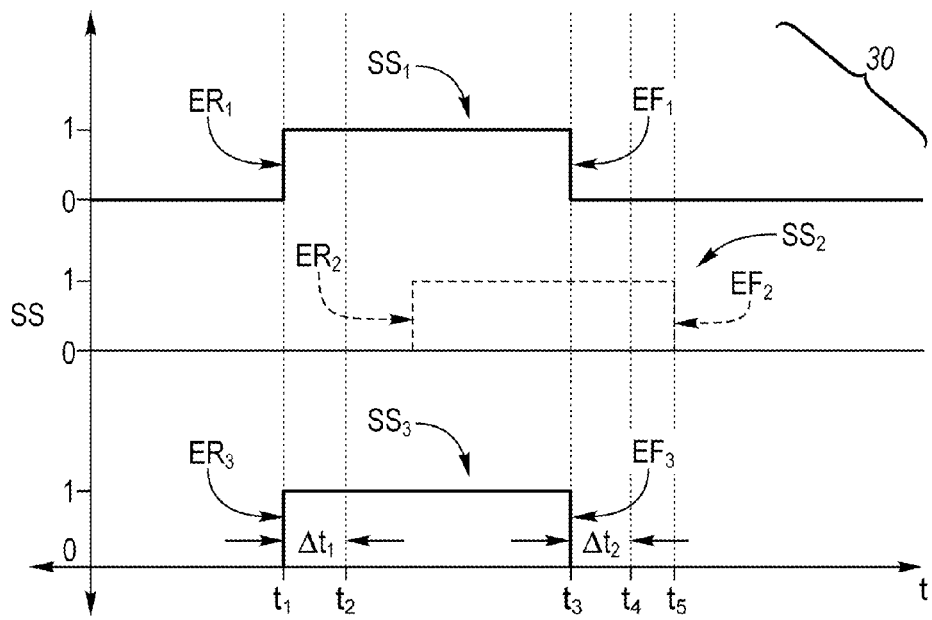
FIG. 3 is a time plot of multiple possible switch states of a given push-button of FIG. 1, with time plotted on the x-axis and a binary switching state plotted on the y-axis.

Referring briefly to FIG. 3, an example binary state time plot 30 depicts the binary switching states (SS) of each of the three example redundant switches $S_1$, $S_2$, and $S_3$ for a given one of the push-buttons 11B shown in FIG. 1. The second switch $S_2$ is off (binary state of 0) in this example. However, in another possible failure mode the second switch $S_2$ may present a delayed rising edge $ER_2$ that lags the rising edges $ER_1$ and $ER_3$ of the other switches $S_1$, $S_3$, as shown via a phantom line step signal. In FIG. 3, time (t) is plotted on the horizontal axis. The binary switching states (SS) are plotted on the vertical axis. Between $t_0$ and $t_1$, all three redundant switches $S_1$, $S_2$, and $S_3$ are in an open state, and thus have a binary state of 0. At $t_1$, however, two of the redundant switches, nominally $S_1$ and $S_3$, change their binary states, and thus correspond to a pressed/closed binary state of 1. State transition thus takes the form of a step signal as shown in FIG. 3. As such, the step signals for the two "on" switches in FIG. 3 have rising and falling edges, e.g., rising edges $ER_1$, $ER_3$ and falling edges $EF_1$, $EF_3$.

The respective rising edges $ER_1$, $ER_3$ and falling edges $EF_1$, $EF_3$ of the switches $S_1$ and $S_3$ coincide precisely in the simplified example of FIG. 3. However, due to variance in apply pressure and any internal construction of the push-buttons 11B, including the switches $S_1$ and $S_3$, such precise time coincidence of the respective rising edges $ER_1$ and $ER_3$ or falling edges $EF_1$ and $EF_3$ as shown is unlikely to occur in actual operation. Therefore, the controller 20 of FIG. 1 may consider sufficient time coincidence to occur whenever the rising edges or the falling edges of the redundant switches $S_1$ and $S_3$ rise or fall, respectively, within a calibrated interval $\Delta t_1$.

For example, if the rising edge $ER_1$ of a binary switch state $SS_1$ for redundant switch $S_1$ occurs at $t_1$ and the rising edge $ER_3$ of a binary switch state $SS_3$ for redundant switch $S_3$ occurs slightly later at $t_2$, the controller 20 calculates a time difference $(t_2-t_1)$ between these two events. Such a delay can be seen in the example phantom line delayed step signal for the second switch $S_2$. The controller 20 can thereafter compare the calculated time difference $(t_2-t_1)$ to the calibrated interval $\Delta t_1$ to determine if the button state transitions for the two affected redundant switches, i.e., $S_1$ and $S_3$ in this example, occurred simultaneously for the purposes of method 100. In other words, the term "simultaneous" may not mean absolute temporal coincidence, but rather temporal coincidence within a small calibrated window of time.

Referring again to FIG. 4, the method 100 proceeds from step 104 to step 106 if the controller 20 determines at step 104 that any two of the redundant switches $S_1$, $S_2$, and $S_3$ have transitioned from a released/open state (0) to a pressed/ closed state (1) within the calibrated interval $\Delta t_1$ of FIG. 3. The method 100 otherwise proceeds to step 114.

At step 106, the controller 20 of FIG. 1 initiates another timer ($t\_{PR}$=0). The method 100 then proceeds to step 108. The timer $t\_{PR}$ in step 106 represents an amount of time that has elapsed since the designated switches of steps 104 and 106 transitioned from a released (0) to a pressed (1) state. The method 100 then proceeds to step 108.

Step 108 entails comparing the value of the timer $t\_{PR}$ initiated at step 106 to a calibrated duration $t\_{PR\_MAX}$ that is indicative of a maximum amount of time considered to represent a valid button pressing event. A non-limiting example duration may be about 2-3 s. The method 100 proceeds to step 114 if the value of the timer $t\_{PR}$ exceeds the calibrated duration $t\_{PR\_MAX}$. Otherwise, the method 100 proceeds to step 110.

At step 110, the controller 20 of FIG. 1 next determines whether the two redundant switches identified at step 106 have just transitioned from a pressed (1) to a released (0) state within another calibrated duration, $t\_{CON\_MAX}$, which is indicative of a concurrent release, i.e., of both of the switches opening concurrently. Again, the term "concurrent release" is any release occurring within the calibrated duration, $t\_{CON\_MAX}$, for instance 20-30 ms as noted above, with this time period illustrated as a calibrated interval $\Delta t_2$ in FIG. 3. Although $\Delta t_1$ and $\Delta t_2$ are identical in FIG. 3, in other embodiments the values of $\Delta t_1$ and $\Delta t_2$ may differ, e.g., by 5-10 ms. If at step 110 the controller 20 determines that such a concurrent release has not occurred, the method 100 proceeds to step 111. The method 100 otherwise proceeds to step 112.

At step 111, the controller 20 of FIG. 1 continues to count the time elapsed since step 106 and proceeds to step 113.

At step 112, the controller 20 next compares the elapsed time from step 110 to a calibrated minimum duration $t\_{PR\_MIN}$ indicative of a calibrated minimum amount of time for a valid press of a button 11B, e.g., 40-60 ms. The method 100 proceeds to step 115 if at least this much time has elapsed. Otherwise, the method 100 proceeds to step 116.

Step 113 entails determining via the controller 20 whether all three of the switches $S_1$, $S_2$, and $S_3$ were pressed, i.e., $S_{1,2,3}$=1. If so, the method 100 proceeds to step 115. The method 100 otherwise repeats step 108.

Step 114 entails determining via the controller 20 whether all three of the switches $S_1$, $S_2$, and $S_3$ were released. If so, the method 100 proceeds to step 116. The method 100 otherwise proceeds to step 118.

At step 116, the controller 20 makes the determination that the push-button 11B has been released (B=REL), and thereafter may take any suitable control action(s) in accordance with this determination. A released push-button 11B indicates that selection of a desired transmission operating range is complete. Using this information, the controller 20 may execute a suitable control action with respect to the transmission 14 via the range selection control signals (arrow $C_{RS}$) of FIG. 1, i.e., ensuring that the transmission 14 is presently operating in the last selected range. For example, if drive (D) was pressed in the range shifter 11 of FIG. 1, then the transmission 14 should be presently operating in the drive range. The method 100 then repeats anew with step 102.

Step 115 entails making a determination via the controller 20 that the push-button 11B is pressed, and then taking any suitable control action(s) in accordance with this determination. A pressed push-button 11B indicates that a driver is actively selecting a desired range, and therefore the controller 20 may execute a control action with respect to the transmission 14 via the range selection control signals (arrow $C_{RS}$) of FIG. 1 in accordance with this request. A typical control action is the shifting of the transmission 14 to the presently selected range via operation of the actuator 27. The method 100 then repeats anew with step 102.

At step 118, the controller 20 determines that the button state is unknown (B=UNK). In response to such a determination, the controller 20 may take a suitable control action such as recording a diagnostic code.

Using the method 100 described above, button state determination may be achieved with improved levels of confidence and/or increased robustness. The number of redundant switches used to achieve a desired level of confidence may be reduced relative to existing methods, e.g., three instead of four switches, or the same number of switches may be used with increased robustness relative to existing methods. Those having ordinary skill in the art will also appreciate that, while the push-button shifter assembly 11 of FIG. 1 is the type of push-button system that may benefit from use of the method 100, other push-button actuators may be readily envisioned, both vehicular and non-vehicular, that control essential system operations in response to by-wire commands. Therefore, the method 100 and controller 20 are not strictly limited to use in transmission range selection. Indeed, all that is required is a by-wire connection of a controller to a push-button, with depression of the push-button closing multiple redundant switches to request a particular operation of a system. The logic underlying the method 100 will still operate effectively as shown in FIG. 4 in such alternative applications.

While the best modes for carrying out the invention have been described in detail, those familiar with the art to which this invention relates will recognize various alternative designs and embodiments for practicing the invention within the scope of the appended claims.

The invention claimed is:

1. A system comprising:
an actuator assembly operable to achieve a selected operating state of the system in response to an electronic state selection signal;
a push-button shifter assembly having a plurality of push-buttons, wherein each of the plurality of push-buttons includes at least three redundant switches, with a binary open/closed state of each of the at least three redundant switches defining the electronic state selection signal; and
a controller in by-wire communication with the actuator assembly and the push-button shifter assembly, wherein the controller receives the electronic state selection signal, and is programmed to determine a button state of each of the push-buttons by determining, in response to receiving the electronic state selection signal, if all of the at least three redundant switches have closed, and, if all of the at least three redundant switches have not closed, by determining whether fewer than all of the at least three redundant switches have closed and opened within a calibrated time interval of each other.

2. The system of claim 1, wherein the controller is further programmed to execute a control action with respect to the system based on the determined button state.

3. The system of claim 2, wherein the system is a vehicle transmission having a plurality of transmission operating ranges, and wherein the actuator assembly is configured to shift the transmission to a selected one of the transmission operating ranges corresponding to the selected operating state.

4. The system of claim 3, wherein the control action includes shifting the transmission to the selected transmission operating range when the detected button state is a pressed button state, and a default control action when the detected button state is an unknown button state.

5. The system of claim 3, wherein the plurality of push-buttons includes a park (P), a reverse (R), a neutral (N), a drive (D), and at least one low gear (L) push-button each corresponding to a different one of the transmission operating ranges.

6. The system of claim 1, wherein the at least three redundant switches in each of the push-buttons are arranged in electrical parallel with respect to each other.

7. The system of claim 1, further comprising a plurality of analog-to-digital (A/D) converters each in communication with a respective one of the redundant switches.

8. The system of claim 1, wherein the at least three redundant switches are dome-type push-button switches.

9. A method of determining a button state of a push-button shifter assembly in a system, the method comprising:
receiving binary electronic state selection signals from the push-button shifter assembly via a controller; and
determining the button state of each of a plurality of push-buttons of the push-button shifter assembly in response to the received binary electronic state selection signals, wherein each of the plurality of push-buttons includes at least three redundant switches, with a binary open/closed state of each of the at least three redundant switches defining the binary electronic state selection signal, including:
determining, in response to receiving the electronic state selection signal, if all of the at least three redundant switches are closed;
if all of the at least three redundant switches are not closed, determining whether fewer than all of the at least three redundant switches have closed and opened within a calibrated time interval of each other; and
executing a control action with respect to the system based on the determined button state.

10. The method of claim 9, wherein the system is a vehicle transmission, and wherein executing the control action includes shifting the transmission to or from a selected transmission operating range when the detected button state is a pressed or released button state, respectively, and executing a default control action when the detected button state is an unknown button state.

11. The method of claim 9, wherein the system includes a plurality of analog-to-digital (A/D) converters each in communication with a respective one of the redundant switches, further comprising: generating the binary electronic state selection signal from the push-button shifter assembly via the plurality of A/D converters by converting an analog switch voltage signal from each of the at least three redundant switches into the binary electronic state selection signals.

12. A vehicle comprising:
an internal combustion engine having an output shaft;
an input clutch;
a transmission having an input shaft that is connected to the output shaft via the input clutch;
an actuator assembly operable to achieve a selected operating range of the transmission in response to an electronic range selection signal, wherein the selected operating range is one of a park (P), reverse (R), neutral (N), drive (D), and low-gear (L) operating range;

a push-button shifter assembly having a plurality of dome-type push-buttons, within each of which a cap covers three redundant switches, wherein the dome-type push-buttons include each of a P, R, N, D, and L push-button corresponding to a respective one of the P, R, N, D, and L operating ranges, wherein each of the plurality of push-buttons includes three redundant switches connected in electrical parallel with each other, with a binary open/closed state of each of the three redundant switches defining the electronic range selection signal; and a controller in by-wire communication with the actuator assembly and the push-button shifter assembly, wherein the controller is programmed to receive the electronic range selection signal, and to determine a button state of each the push-buttons covered by the cap by determining, in response to receiving the electronic range selection signal, if the three redundant switches have all closed, and, if all three redundant switches have not closed, whether two of the three redundant switches have closed and opened within a calibrated time interval of each other.

13. The vehicle of claim 12, wherein the controller is further programmed to execute a control action with respect to the transmission based on the determined button state, including recording a diagnostic code in a memory of the controller.

14. The vehicle of claim 13, wherein the control action includes a shift of the transmission to the selected transmission operating range when the detected button state is a pressed button state, and executing a default control action when the detected button state is an unknown state.

15. The vehicle of claim 12, wherein the cap is constructed of a resilient material.

16. The vehicle of claim 12, wherein the cap is constructed of a rigid material.

17. The vehicle of claim 12, further comprising three analog-to-digital (A/D) converters each in communication with a respective one of the three redundant switches, and wherein the three A/D converters collectively output the electronic range selection signal for a given one of the push-buttons.

\* \* \* \* \*